United States Patent

[11] 3,619,781

[72] Inventors George P. Cartianu; Aurin A. G. Popea, both of Bucharest, Romania
[21] Appl. No. 788,701
[22] Filed Dec. 30, 1968
[45] Patented Nov. 9, 1971
[73] Assignee Ministerul Industriei Constructiilor de Masini Bucharest, Romania
[32] Priority Dec. 30, 1967
[33] Romania
[31] 55542

[54] SYSTEM FOR THE TRANSMISSION OF A RADIO-FREQUENCY SIGNAL WITH SEPARATION INTO INDIVIDUALLY TRANSMITTABLE SUBBANDS

4 Claims, 3 Drawing Figs.

[52] U.S. Cl. .......... 325/1, 325/3, 325/7, 325/11, 325/146, 333/70 T
[51] Int. Cl. .......... H04b 7/14
[50] Field of Search .......... 325/1–15, 342, 373, 374, 379, 430, 431, 435, 440, 442, 444, 445, 452, 460, 139, 45–48, 145, 146, 148, 153, 184; 179/15 AP, 15 OR, 2.5, 2.5 C, 15; 333/70 T

[56] References Cited

UNITED STATES PATENTS

| | | | |
|---|---|---|---|
| 2,522,368 | 9/1950 | Guanella .......... | 179/15 |
| 2,630,497 | 3/1953 | Armstrong .......... | 179/15 |
| 2,651,673 | 9/1953 | Fredendall .......... | 333/70 T |
| 2,854,641 | 9/1958 | Daquier .......... | 333/70 T |

*Primary Examiner*—Robert L. Griffin
*Assistant Examiner*—Albert J. Mayer
*Attorney*—Karl F. Ross

ABSTRACT: A method of and system for separating a wide-band signal into individually transmittable subbands. The wide-band signal is iteratively filtered in a plurality of stages each adapted to tap off a respective subband. Phase conversion is effected between the filter stages upon the signals iterative from each stage to a successive stage in the iterative filtering of said wide-band signal. The output of a preceding stage is used to phase-modulate the input to a succeeding stage.

George Popescu Cartianu
Aurin A.G. Popea
INVENTORS

BY Karl F. Ross
Attorney

George Popescu Cartianu
Aurin A.G. Popea

INVENTORS

BY

Karl F. Ross

Attorney

SYSTEM FOR THE TRANSMISSION OF A RADIO-FREQUENCY SIGNAL WITH SEPARATION INTO INDIVIDUALLY TRANSMITTABLE SUBBANDS

The present invention relates to a method of and a system for phase-modulation radiofrequency transmission of wide-band signals, especially for transmissions on radio-relay lines for multiplex telephony or television signals with a view to improving the frequency stability as well as the other indicia of quality of the transmission; the invention also relates to an iterative filtering process for the wide-band signal so as to compensate the attenuation and phase distortions appearing at the separation zones of the spectrum in the subbands.

Radio relays with frequency modulation, used for transmitting wide-band signals are, generally, subject to the following inconveniences: The need for auxiliary devices for automatic adjustment, and for maintaining the central frequency stability within permissible limits; these devices introduce significant complications, increase the capital costs and operation expenses, while diminishing the working safety; on the other hand, there arises the difficulty of obtaining a linear modulation response characteristic in the case of the large frequency deviation for a very wide-band modulation signal.

Phase modulation, while limiting these inconveniences, could not be used heretofore under the present state of the art of wide-band systems, since these earlier systems have been unable to satisfy simultaneously the two fundamental requisites of phase modulation:

a. the modulation has to be effected at a point of the transmission chain where the value of the carrier frequency is sufficiently small that, by successive multiplications, the desired value of the modulation index can be arrived at.

b. the modulation must be applied at a point of the transmission chain, where the carrier frequency has a much higher value than the maximum frequency of the modulating signal spectrum.

It is, therefore, the principal object of the present invention to provide a method of and a system for the transmission of wide-band radiofrequency signals and also a system for the iterative filtering of such signals which will avoid the aforementioned difficulties.

The system of this invention resolves the contradiction previously discussed, by allowing the two conditions above mentioned to be compatible along a band as wide as possible, through the division of the modulation-signal spectrum into several subbands and the simultaneous application of phase modulation at several points of the frequency multiplication chain, so that a subband containing the components of a higher frequency should modulate the transmitter at a higher central frequency than that corresponding to the lower adjacent subband. This mode of operation gives an efficient solution to the important problem of the frequency stability in the terminal radio-relay stations.

This invention makes use of iterative filtering which compensates the attenuation and phase distortions occurring in all the filtering paths, especially in the zones separating the passing region from the attenuation region of every filter.

The invention is described in greater detail hereinafter, reference being made to the accompanying drawing in which.

Figure 1:
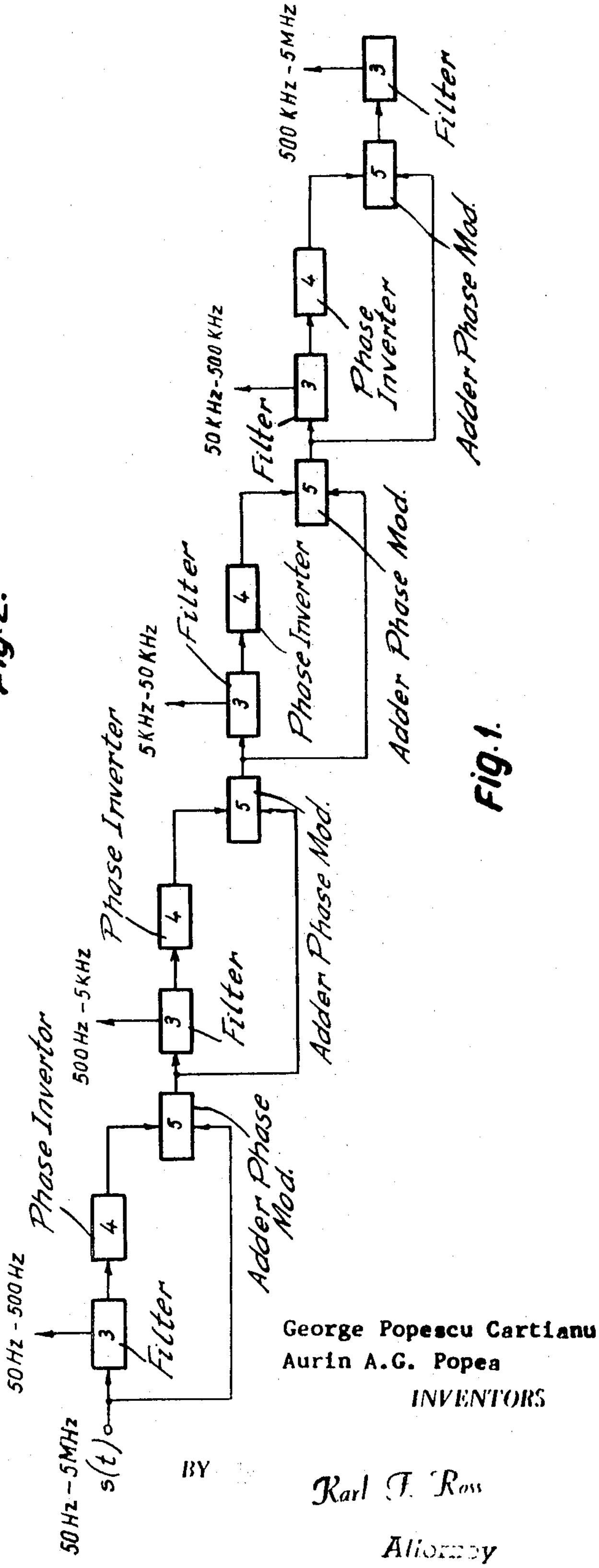
FIG. 1 is a block diagram of a filtering system of the iterative type using both band-filters and phase converters as applied to a 50 Hz. to 5 MHz. band, divided into five subbands.

With respect to the system of FIG. 1, the lower frequency limit of the filters can be the same for all of the filters, while the higher frequency limit should be respectively equal to the highest extremity of each band; it increases successively so as to cover finally the whole frequency band of the transmitted signal. The same results can be obtained by using low-pass instead of band-pass filters.

As noted earlier, FIG. 1 represents an iterative filtering system wherein the wide-band signal $s(t)$ is fed serially to the band filter 3 and phase converter (phase inverter) 4 of the first stage, the subband 50–500 Hz. being tapped off as shown. The output of each converter 4 is applied to the adder (phase modulator) 5 together with the original signal, the output of each adder serving as the input to the next stage. In all five such stages are provided.

Figure 2:
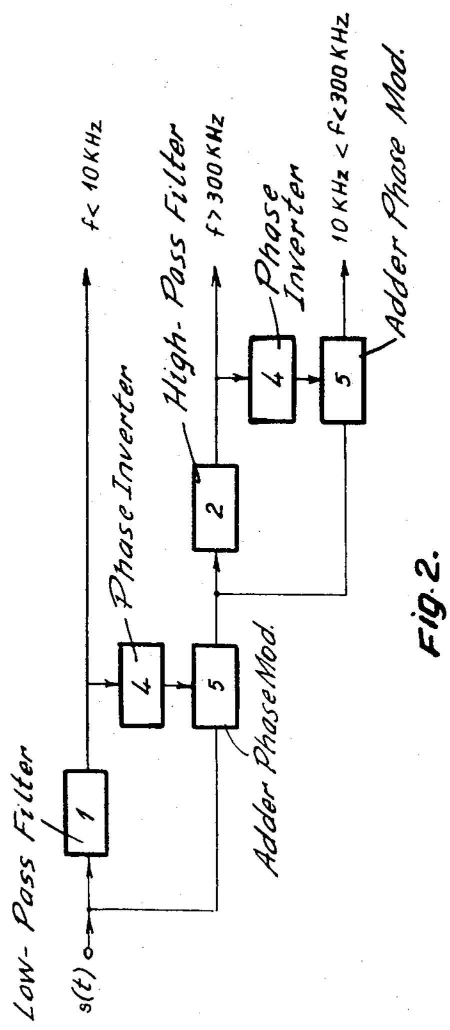
FIG. 2 is a simplified alternative diagram of a filtering system possessing three subbands and giving best results in the case of video signals.

In case the spectrum is only divided into three subbands (FIG. 2), the outfit is simplified since it requires only two filters: a low-pass filter 1 and a high-pass filter 2. The first one is responsible for the separation of the first spectrum subband, while the second filter is used in order to obtain subband 3. Stages 4 and 5 are respectively a phase-converter stage and a summator stage the former having an output corresponding to the modulating signal for the phase modulation of the original signal. With the help of the second phase converter 4 and of the second adder 5, we can also obtain the separation of subband 2.

Figure 3:
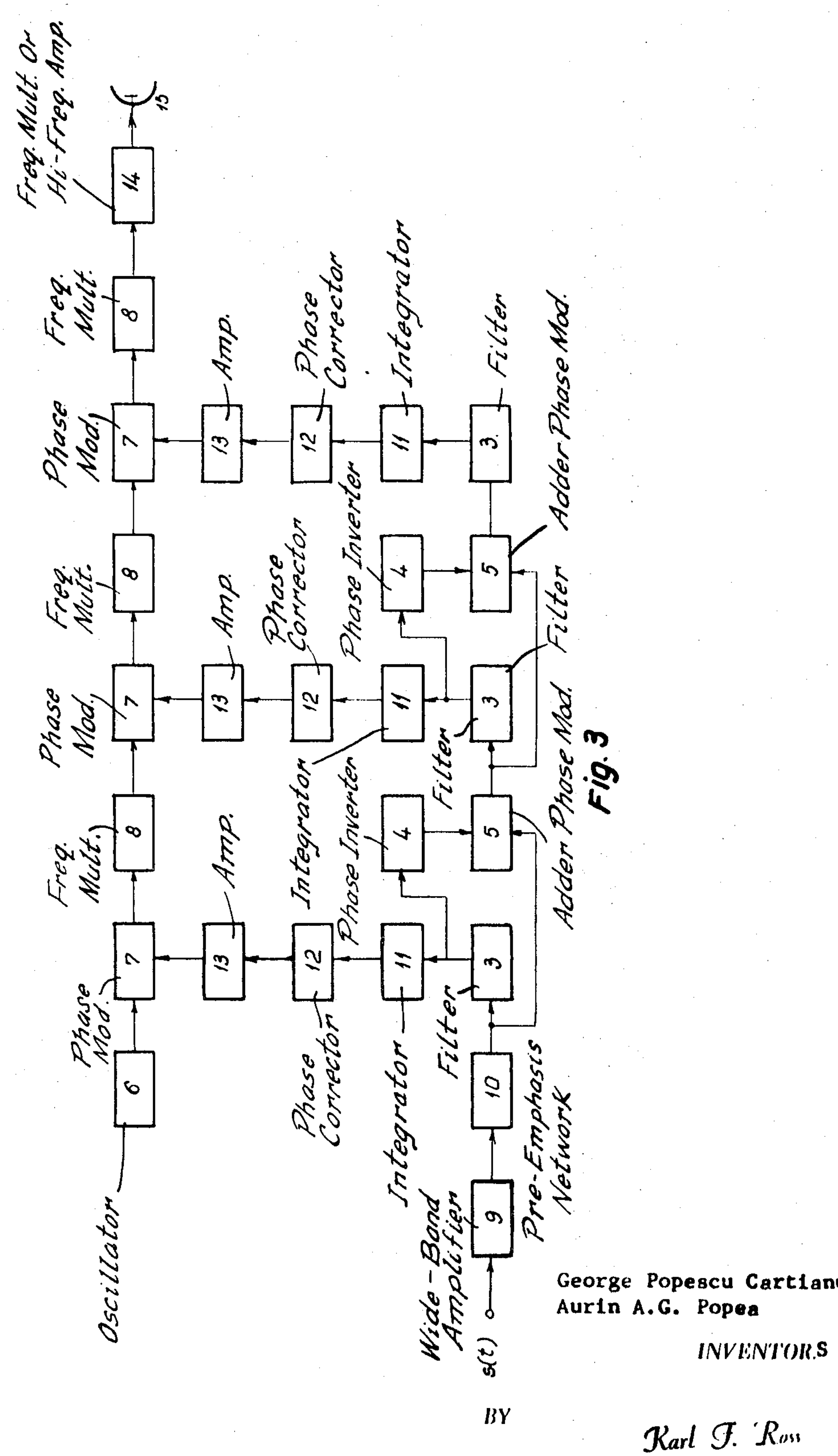
FIG. 3 is a diagram showing the application of the present method to radio transmission.

The device of FIG. 3 consists of a wide-band amplifier 9 and the preemphasis network 10 through which the modulating signal reaches stages 3 (band filters), 4 (phase converters) and 5 (adders) of the filtering system which produces the separation into subbands. The signal, corresponding to each of the modulation paths is, successively, introduced in the integration circuit 11, the phase corrector 12 and the amplifier 13, and then it attacks the phase modulator 7. This receives from the master oscillator 6 the high-frequency oscillations of great stability. With the help of the frequency multipliers 8 the final value of the carrier frequency is reached, while, at the same time the modulation index is increased. The ultrahigh frequency signal so obtained is applied to the power stage 14 which can be either the last frequency multiplier or an ultrahigh frequency amplifier. The output is connected to the aerial or antenna 15.

The ultrahigh frequency radio-transmitting system with several ultrahigh frequency channels, by applying, according to the invention, the phase modulation process, uses several modulation chains corresponding to the number of ultrahigh frequency channels to be transmitted. All these chains are fed by a single oscillator 6. With the help of frequency converters and of oscillators of high stability, the central frequency of each channel is obtained. The diagram of all channels is similar to that of FIG. 3, working on a common aerial.

The advantages offered by systems employing the proposed filtering process are:

a. the possibility of transmitting, with a minimum of distortion, the wide-band signals in phase-modulation systems, as well as in other transmission systems where it is necessary to divide the basic spectrum in several parts;

b. the possibility of transmitting a wide-band signal on several channels, each of which transmits a subband of the frequency spectrum of the basic band, so that at the receiving end the signal can be recomposed;

c. the number of subbands into which the spectrum can be divided may be as large as is desired, since the band width of the transmitted signal is not a limiting factor; thus the device is particularly important in the case of phase-modulation transmissions for radio relays of large capacity, as well as in the case of space communications by artificial satellite, with or without an extension of the reaction threshold;

d. the possibility of a substantial ratio reduction of the extreme frequencies for each of the subbands in the case of using the proposed modulation process;

e. the system can be realized by means of semiconductors;

f. the adjustment of the system is simple.

In comparison with prior art processes and systems, the proposed modulation process offers the following advantages:

a. the carrier frequency is determined by one or a few non-modulated oscillators of great stability capable of assuring the frequency stability of the whole outfit, the use of an automatic control of the system frequency being unnecessary;

b. the system is simple, easy to work, having a greater operating facility owing to the absence of automatic adjustment systems;

c. the linearity is better within a wide band of modulation frequencies, because all the phase modulators work with a small phase deviation, i.e. in the linear zone; and d. the system using the proposed modulation system possesses a high elasticity with regard to the possibility of increasing the transmission capacity according to the necessities, by introducing new phase modulators in the multiplication chain.

We claim:

1. A method of transmitting a wide-band radiofrequency signal, comprising the steps of:

a. filtering said wide-band signal to form a first subband;
b. deriving by phase invertion a phase-modulation signal from the filtered signal in step (a);
c. phase-modulating the wide-band signal derived prior to filtering in step (a) with the phase-modulation signal of step (b) to produce a phase-modulated signal;
d. filtering said phase-modulated signal to produce a second subband while generating a further phase-modulating signal;
e. phase-modulating the phase-modulated signal of step (c) with the phase-modulating signal of step (d) to generate a further subband upon filtering; and
f. individually transmitting the individual subbands along respective paths.

2. A radiofrequency transmission system, comprising a first filter receiving, as an input, a wide-band signal for isolating a subband thereof; a first inverter stage connected to said first filter for generating from the output thereof a phase-modulation signal; a first modulator for phase-modulating said wide-band signal with said phase-modulating signal to produce a phase-modulated output; means for applying said wide-band signal to said first modulator; a second filter connected to said first modulator for separating a further subband from the output of said first modulator; a second inverter stage connected to said second filter and responsive to the output thereof for generating a respective phase-modulation signal; and a second modulator connected to said first modulator and to said second inverter stage for phase modulation of the output of said first modulator with the phase-modulation signal of said second inverter stage and producing a corresponding phase-modulated signal.

3. The system defined in claim 2, further comprising additional chains of filter, inverter stage and modulator connected to said third modulator and to one another for successively deriving a phase-modulated signal from a preceding modulator, filtering the phase-modulated signal from the preceding modulator, deriving a respective subband and a phase-modulation signal from the filtered signal of the preceding modulator and modulating the output signal of the preceding modulator with the phase modulation signal derived upon the filtering thereof to produce a phase-modulated signal serving as the input to a succeeding phase modulator.

4. The system defined in claim 3, further comprising means for individually transmitting said subbands along respective paths and including a respective integrater connected to the corresponding filter, a respective phase corrector connected to each integrater and a respective amplifier connected to each phase corrector, said system further comprising a master oscillator feeding in succession a chain of alternating phase modulators and frequency multipliers, the amplifiers associated with each of said subbands applying respective modulating signals to the phase modulators of said chain.

* * * * *